(12) United States Patent
Fern et al.

(10) Patent No.: US 11,593,876 B1
(45) Date of Patent: *Feb. 28, 2023

(54) MACHINE LEARNING FOR DETERMINING AN API COMMUNICATION

(71) Applicant: Block, Inc., San Francisco, CA (US)

(72) Inventors: Adam Jeremy Fern, San Francisco, CA (US); Andrew Kimball, Moraga, CA (US); John Bryan Scott, San Francisco, CA (US); Brian Boates, San Francisco, CA (US)

(73) Assignee: BLOCK, INC., Oakland, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/154,028

(22) Filed: Jan. 21, 2021

Related U.S. Application Data

(63) Continuation of application No. 14/602,486, filed on Jan. 22, 2015, now Pat. No. 10,902,512.

(51) Int. Cl.
 *G06Q 40/02* (2012.01)
 *G06Q 20/02* (2012.01)
(52) U.S. Cl.
 CPC .......... *G06Q 40/025* (2013.01); *G06Q 20/02* (2013.01)
(58) Field of Classification Search
 None
 See application file for complete search history.

(56) References Cited

U.S. PATENT DOCUMENTS

| | | | |
|---|---|---|---|
| 5,696,907 A | * | 12/1997 | Tom ..................... G06Q 40/025 705/38 |
| 5,963,919 A | | 10/1999 | Brinkley et al. |
| 6,249,774 B1 | | 6/2001 | Roden et al. |
| 6,307,576 B1 | | 10/2001 | Rosenfeld |

(Continued)

FOREIGN PATENT DOCUMENTS

| | | |
|---|---|---|
| JP | 2004-118547 A | 4/2004 |
| WO | 99/03076 A1 | 1/1999 |

OTHER PUBLICATIONS

Allistair, Barr, Reuters, Update 5, "Amazon offering loans to its online sellers", Sep. 27, 2012, pp. 1-4. (Year: 2012).*

(Continued)

*Primary Examiner* — Mohammad Z Shaikh
(74) *Attorney, Agent, or Firm* — Mattingly & Malur, PC

(57) ABSTRACT

In some examples, a payment processing system receives transaction information of transactions performed by a plurality of merchants. The payment processing system may generate, using one or more trained machine learning classifiers and based on transaction information of a current transaction of a first merchant, a request to a plurality of financial systems. Further, the payment processing system may expose an application programming interface (API) to at least one financial system of the plurality of financial systems for electronic communication of financial information at least one of to or from the at least one financial system. Additionally, the payment processing system may generate, using the one or more trained machine learning classifiers and based at least on information obtained from the at least one financial system, via the API, one or more payment actions for the first merchant to perform using the payment processing system.

20 Claims, 8 Drawing Sheets

(56) References Cited

U.S. PATENT DOCUMENTS

| | | | |
|---|---|---|---|
| 6,826,544 B1 | 11/2004 | Johnson | |
| 6,941,281 B1* | 9/2005 | Johnson | G06Q 20/102 |
| | | | 705/40 |
| 6,996,538 B2 | 2/2006 | Lucas | |
| 7,035,821 B1* | 4/2006 | Smith, II | G06Q 40/02 |
| | | | 235/379 |
| 7,103,570 B1* | 9/2006 | Morea | G06Q 20/382 |
| | | | 705/26.1 |
| 7,181,427 B1 | 2/2007 | DeFrancesco et al. | |
| 7,607,577 B1 | 10/2009 | Yu et al. | |
| 7,797,231 B1 | 9/2010 | Loeb et al. | |
| 7,953,653 B2 | 5/2011 | Siggers | G06Q 30/02 |
| | | | 705/35 |
| 8,150,764 B2* | 4/2012 | Crowe | G06Q 40/00 |
| | | | 705/38 |
| 8,239,227 B2 | 8/2012 | Megiddo et al. | |
| 8,606,695 B1* | 12/2013 | Arora | G06Q 40/02 |
| | | | 705/38 |
| 8,666,847 B1 | 3/2014 | Blank et al. | |
| 8,732,040 B1 | 5/2014 | Prabhune et al. | |
| 9,519,892 B2 | 12/2016 | Martell et al. | |
| 9,727,912 B1* | 8/2017 | Poursartip | G06Q 40/025 |
| 9,786,005 B1* | 10/2017 | Poursartip | G06Q 40/025 |
| 9,824,394 B1* | 11/2017 | Boates | G06Q 20/20 |
| 9,836,786 B1 | 12/2017 | Baker | |
| 9,892,458 B1* | 2/2018 | Shearer | G06Q 20/202 |
| 9,984,412 B1* | 5/2018 | Poursartip | G06Q 20/20 |
| 10,019,698 B1 | 7/2018 | Scott et al. | |
| 10,062,109 B1 | 8/2018 | Poursartip et al. | |
| 10,346,907 B1 | 7/2019 | Poursartip et al. | |
| 10,410,243 B2 | 9/2019 | Boal | |
| 10,445,826 B1 | 10/2019 | Poursartip et al. | |
| 10,453,086 B1* | 10/2019 | Scott | G06Q 20/24 |
| 10,455,826 B2 | 10/2019 | Palomares et al. | |
| 10,540,713 B2 | 1/2020 | Frohwein et al. | |
| 10,565,642 B1 | 2/2020 | Cieri et al. | |
| 10,607,286 B1* | 3/2020 | Poursartip | G06Q 20/20 |
| 10,902,512 B1 | 1/2021 | Fern et al. | |
| 11,100,576 B1 | 8/2021 | Poursartip et al. | |
| 11,367,096 B1 | 6/2022 | Scott et al. | |
| 2001/0034681 A1* | 10/2001 | Abbott | G06Q 40/00 |
| | | | 705/35 |
| 2002/0138412 A1* | 9/2002 | Englert | G06Q 40/025 |
| | | | 705/38 |
| 2002/0152139 A1 | 10/2002 | Hogan | |
| 2002/0174061 A1* | 11/2002 | Srinivasan | G06Q 40/04 |
| | | | 705/38 |
| 2003/0101107 A1 | 5/2003 | Agarwal et al. | |
| 2003/0130959 A1* | 7/2003 | Rosenbaum | G06Q 20/401 |
| | | | 705/75 |
| 2004/0054625 A1* | 3/2004 | Kellogg | G06Q 20/40 |
| | | | 705/41 |
| 2004/0064398 A1 | 4/2004 | Browne et al. | |
| 2004/0193540 A1 | 9/2004 | Brown et al. | |
| 2006/0095350 A1 | 5/2006 | Hall et al. | |
| 2006/0095367 A1 | 5/2006 | Iverson | |
| 2006/0224480 A1* | 10/2006 | Bent | G06Q 40/00 |
| | | | 705/35 |
| 2007/0156579 A1 | 7/2007 | Manesh | |
| 2007/0156584 A1* | 7/2007 | Barnes | G06Q 20/102 |
| | | | 705/40 |
| 2007/0174191 A1* | 7/2007 | Keaton | G06Q 40/04 |
| | | | 705/40 |
| 2007/0244779 A1* | 10/2007 | Wolff | G06Q 40/00 |
| | | | 705/35 |
| 2007/0255635 A1 | 11/2007 | Multer et al. | |
| 2007/0255653 A1 | 11/2007 | Tumminaro et al. | |
| 2008/0033825 A1* | 2/2008 | Goldin | G06Q 30/0226 |
| | | | 705/14.27 |
| 2008/0052229 A1* | 2/2008 | Sheinker | G06Q 30/06 |
| | | | 705/40 |
| 2008/0086410 A1* | 4/2008 | MacGuire | G06Q 30/04 |
| | | | 705/38 |
| 2008/0195534 A1 | 8/2008 | Landis et al. | |
| 2009/0006249 A1* | 1/2009 | Morgan | G06Q 20/10 |
| | | | 705/39 |
| 2009/0043697 A1* | 2/2009 | Jacobs | G06Q 20/10 |
| | | | 705/39 |
| 2009/0048884 A1 | 2/2009 | Olives et al. | |
| 2009/0187482 A1* | 7/2009 | Blount | G06Q 40/02 |
| | | | 705/14.1 |
| 2010/0017324 A1* | 1/2010 | Brownhill | G06Q 40/04 |
| | | | 705/37 |
| 2010/0223154 A1* | 9/2010 | Frohwein | G06Q 20/10 |
| | | | 705/26.1 |
| 2010/0228651 A1 | 9/2010 | Becerra et al. | |
| 2010/0299251 A1 | 11/2010 | Thomas | |
| 2010/0306071 A1 | 12/2010 | Kay | |
| 2011/0166987 A1* | 7/2011 | Hu | G06Q 40/025 |
| | | | 705/38 |
| 2011/0191173 A1 | 8/2011 | Blackhurst et al. | |
| 2011/0191239 A1 | 8/2011 | Blackhurst et al. | |
| 2011/0251870 A1 | 10/2011 | Tavares et al. | |
| 2012/0022945 A1 | 1/2012 | Falkenberg et al. | |
| 2012/0036032 A1* | 2/2012 | Frohwein | G06Q 30/0613 |
| | | | 705/26.3 |
| 2012/0054097 A1* | 3/2012 | Frohwein | G06Q 20/108 |
| | | | 705/40 |
| 2012/0066033 A1* | 3/2012 | Frohwein | G06Q 30/0215 |
| | | | 705/14.1 |
| 2012/0089436 A1* | 4/2012 | Tavares | G06Q 30/0201 |
| | | | 705/7.29 |
| 2012/0173416 A1* | 7/2012 | Bayne | G06Q 20/10 |
| | | | 705/39 |
| 2012/0191506 A1* | 7/2012 | Tavares | G06Q 30/0201 |
| | | | 705/7.29 |
| 2012/0209734 A1 | 8/2012 | Brooks et al. | |
| 2012/0233010 A1* | 9/2012 | Frohwein | G06Q 20/10 |
| | | | 705/26.3 |
| 2012/0233090 A1 | 9/2012 | Tavares et al. | |
| 2012/0239552 A1* | 9/2012 | Harycki | G06Q 40/02 |
| | | | 705/38 |
| 2012/0271765 A1 | 10/2012 | Cervenka et al. | |
| 2013/0085804 A1 | 4/2013 | Leff et al. | |
| 2013/0138544 A1* | 5/2013 | Chapman | G06Q 40/02 |
| | | | 705/35 |
| 2013/0211892 A1* | 8/2013 | Frohwein | G06Q 30/0214 |
| | | | 705/14.16 |
| 2013/0268417 A1 | 10/2013 | Sgueglia | |
| 2014/0006202 A1* | 1/2014 | Frohwein | G06Q 40/025 |
| | | | 705/26.3 |
| 2014/0019236 A1* | 1/2014 | Argue | G06Q 30/02 |
| | | | 705/14.51 |
| 2014/0025525 A1* | 1/2014 | Frohwein | G06Q 30/08 |
| | | | 705/26.3 |
| 2014/0058804 A1* | 2/2014 | Zhou | G06Q 30/02 |
| | | | 705/300 |
| 2014/0067677 A1 | 3/2014 | Ali et al. | |
| 2014/0143405 A1 | 5/2014 | Pavlidis et al. | |
| 2014/0180809 A1 | 6/2014 | Boal | |
| 2014/0244361 A1 | 8/2014 | Zhang et al. | |
| 2014/0244479 A1* | 8/2014 | White | G06Q 40/025 |
| | | | 705/38 |
| 2014/0245210 A1 | 8/2014 | Battcher et al. | |
| 2014/0358766 A1* | 12/2014 | Nayyar | G06Q 40/025 |
| | | | 705/38 |
| 2015/0026035 A1 | 1/2015 | Showalter | |
| 2015/0095210 A1* | 4/2015 | Grech | G06Q 40/025 |
| | | | 705/38 |
| 2015/0149333 A1* | 5/2015 | Yaplee | G06Q 40/12 |
| | | | 705/30 |
| 2015/0161606 A1* | 6/2015 | Lee | G06Q 50/01 |
| | | | 705/44 |
| 2015/0168478 A1 | 6/2015 | Ohlen et al. | |
| 2015/0254768 A1* | 9/2015 | Menon | G06Q 20/10 |
| | | | 705/38 |
| 2015/0269578 A1* | 9/2015 | Subramanian | G06Q 20/12 |
| | | | 705/44 |
| 2016/0019614 A1 | 1/2016 | Dziuk | |
| 2016/0055427 A1 | 2/2016 | Adjaoute | |

(56) References Cited

U.S. PATENT DOCUMENTS

| | | | |
|---|---|---|---|
| 2016/0210634 A1 | 7/2016 | Trujillo | |
| 2017/0213282 A1 | 7/2017 | Dziuk | |
| 2018/0211212 A1 | 7/2018 | Chin | |
| 2019/0333144 A1* | 10/2019 | Frohwein | G06Q 40/025 |
| 2020/0219102 A1 | 7/2020 | Varma et al. | |

OTHER PUBLICATIONS

"Merchant financing system cash advance—Google Scholar", Retreived from Internet URL: https://scholar.google.com/scholar?hl=en&as_sdt=7%2C47&as_ylo=2010&as_yhi=2014&q=merchant+financing+system+cash+advance&btnG= on Dec. 27, 2021, pp. 1.
Final Office Action dated Aug. 19, 2021, for U.S. Appl. No. 16/658,198, of Scott, J.B et al., filed Oct. 21, 2019.
Final Office Action dated Dec. 30, 2021, for U.S. Appl. No. 16/596,903, of Poursartip, A., et al., filed Oct. 9, 2019.
Notice of Allowance dated Feb. 21, 2019, for U.S. Appl. No. 16/111,278, of Poursartip, A., et al., filed Aug. 24, 2018.
Non-Final Office Action dated Apr. 5, 2019, for U.S. Appl. No. 14/522,287, of Cieri, M.M., et al., filed Oct. 23, 2014.
Non Final Office Action dated May 31, 2019, for U.S. Appl. No. 15/670,305, of Poursartip, A., et al., filed Aug. 7, 2017.
Notice of Allowance dated Jun. 4, 2019, for U.S. Appl. No. 14/491,958, of Poursartip, A., et al., filed Sep. 19, 2014.
Notice of Allowance dated Jun. 12, 2019, for U.S. Appl. No. 14/676,678 of Scott, J.B., et al., filed Apr. 1, 2015.
Final Office Action dated Aug. 2, 2019, for U.S. Appl. No. 14/602,486, of Fern, A.J., et al., filed Jan. 22, 2015.
Notice of Allowance dated Sep. 30, 2019, for U.S. Appl. No. 14/522,287, of Cieri, M.M., et al., filed Oct. 23, 2014.
Notice of Allowance dated Oct. 31, 2019, for U.S. Appl. No. 15/670,305, of Poursartip, A., et al., filed Aug. 7, 2017.
Non-Final Office Action dated Mar. 18, 2020, for U.S. Appl. No. 14/602,486, of Cieri, M.M, et al., filed Oct. 23, 2014.
Non-Final Office Action dated Sep. 29, 2020, for U.S. Appl. No. 16/808,860, of Poursartip, A., et al., filed Mar. 4, 2020.
Notice of Allowance dated Sep. 17, 2020, for U.S. Appl. No. 14/602,486, of Fern A., A et al., filed Jan. 22, 2015.
Non-Final Office Action dated Jan. 14, 2021, for U.S. Appl. No. 16/777,522, of Cieri, M.M, et al., filed Jan. 30, 2020.
Pre-Interview First Office Action dated Feb. 19, 2021, for U.S. Appl. No. 16/658,198, of Scott, J.B et al., filed Oct. 21, 2019.
Final Office Action dated Mar. 1, 2021, for U.S. Appl. No. 16/808,860, of Poursartip, A., et al., filed Mar. 4, 2020.
"Oracle Retail Advanced Inventory Planning," www.oracle.com, pp. 1-2 (2013).
Barr, A., "Update 5—Amazon offering loans to its on line sellers," www.reuters.com, dated Sep. 27, 2012, Retrieved from the Internet URL: http://www.reuters.com/article/amazon-lending-idUSL1E8KRA1020120927?type=companyNews, on Jun. 1, 2017, pp. 1-4.
Comptroller's Handbook, "Accounts Receivable and Inventory Financing," Comptroller of the Currency Administrator of National Banks, published Mar. 2000, pp. 1-78.
Giusti, A.C., "Want More Revenue? Enhance The Offers: Carefully matching merchants with the right products and ensuring agents know them well can dictate how much an ISO may earn from value-added services," ISO & Agent 7.4, dated May 1, 2011, pp. 1-2.
Greene, J.H., "Production and Inventory Control Handbook," The McGraw-Hill, Third Edition, pp. 287 (Year: 1997).
Greene, J.H., "Production and Inventory Control Handbook," The McGraw-Hill, Third Edition, pp. 290 (Year: 1997).
Leung, L., "PayPal ramps up small-business loans," The Orange County register, Journal—Gazette [Ft. Wayne, Ind], dated Feb. 10, 2014, pp. 1-2.
Proquest, "Intuit Launches New Personalizable Small Business Channel on Quicken.com Web Site", Business/Technology Editors, Business Wire New York, Jul. 1998, pp. 1-3.
Non-Final Office Action dated Jan. 8, 2015, for U.S. Appl. No. 14/491,958, of Poursartip, A., et al., filed Sep. 19, 2014.
Non-Final Office Action dated Mar. 27, 2015, for U.S. Appl. No. 14/491,965, of Poursartip, A., et al., filed Sep. 19, 2014.
Non-Final Office Action dated Mar. 27, 2015, for U.S. Appl. No. 14/491,967, of Poursartip, A., et al., filed Sep. 19, 2014.
Final Office Action dated May 20, 2015, for U.S. Appl. No. 14/491,958, of Poursartip, A., et al., filed Sep. 19, 2014.
Advisory Action dated Jul. 27, 2015, for U.S. Appl. No. 14/491,958, of Poursartip, A., et al., filed Sep. 19, 2014.
Non-Final Office Action dated Aug. 27, 2015, for U.S. Appl. No. 14/540,947, of Baker, G. K., et al., filed Nov. 13, 2014.
Final Office Action dated Oct. 8, 2015, for U.S. Appl. No. 14/491,967, of Poursartip, A., et al., filed Sep. 19, 2014.
Final Office Action dated Nov. 6, 2015, for U.S. Appl. No. 14/491,965, of Poursartip, A., et al., filed Sep. 19, 2014.
Non-Final Office Action dated Jan. 5, 2016, for U.S. Appl. No. 14/491,958, of Poursartip, A., et al., filed Sep. 19, 2014.
Non-Final Office Action dated Feb. 12, 2016, for U.S. Appl. No. 14/540,947, of Baker, G. K., et al., filed Nov. 13, 2014.
Non-Final Office Action dated Sep. 9, 2016, for U.S. Appl. No. 14/540,947, of Baker, G. K., filed Nov. 13, 2014.
Non-Final Office Action dated May 5, 2016, for U.S. Appl. No. 14/491,967, of Poursartip, A., et al., filed Sep. 19, 2014.
Non-Final Office Action dated Jun. 17, 2016, for U.S. Appl. No. 14/491,965, of Poursartip, A., et al., filed Sep. 19, 2014.
Non-Final Office Action dated Jun. 17, 2016, for U.S. Appl. No. 14/622,605, of Scott, J.B., et al., filed Feb. 13, 2015.
Final Office Action dated Oct. 21, 2016, for U.S. Appl. No. 14/491,967, of Poursartip, A., et al., filed Sep. 19, 2014.
Non-Final Office Action dated Nov. 28, 2016, for U.S. Appl. No. 14/491,963, of Poursartip, A., et al., filed Sep. 19, 2014.
Non-Final Office Action dated Dec. 19, 2016, for U.S. Appl. No. 14/491,965, of Poursartip, A., et al., filed Sep. 19, 2014.
Examiner's Answer to Appeal Brief dated Jan. 27, 2017, for U.S. Appl. No. 14/491,958, of Poursartip, A., et al., filed Sep. 19, 2014.
Non-Final Office Action dated Feb. 10, 2017, for U.S. Appl. No. 14/622,605, of Scott, J.B., et al., filed Feb. 13, 2015.
Notice of Allowance dated Mar. 30, 2017, for U.S. Appl. No. 14/491,967, of Poursartip, A., et al., filed Sep. 19, 2014.
Final Office Action dated Apr. 6, 2017, for U.S. Appl. No. 14/540,947, of Baker, G.K., filed Nov. 13, 2014.
Non-Final Office Action dated May 10, 2017, for U.S. Appl. No. 14/602,486, of Fern, A.J., et al., filed Jan. 22, 2015.
Non-Final Office Action dated May 16, 2017, for U.S. Appl. No. 14/676,678, of Scott, J.B., et al., filed Apr. 1, 2015.
Notice of Allowance dated Jun. 7, 2017, for U.S. Appl. No. 14/491,963, of Poursartip, A., et al., filed Sep. 19, 2014.
Notice of Allowance dated Jun. 22, 2017, for U.S. Appl. No. 14/540,947, of Baker, G.K., filed Nov. 13, 2014.
Final Office Action dated Jul. 27, 2017, for U.S. Appl. No. 14/491,965, of Poursartip, A., et al., filed Sep. 19, 2014.
Notice of Allowance dated Sep. 22, 2017, for U.S. Appl. No. 14/622,605, of Scott, J.B., et al., filed Feb. 13, 2015.
Non-Final Office Action dated Nov. 8, 2017, for U.S. Appl. No. 15/725,591, of Poursartip, A., et al., filed Oct. 5, 2017.
Final Office Action dated Dec. 29, 2017, for U.S. Appl. No. 14/676,678, of Scott, J.B., et al., filed Apr. 1, 2015.
Final Office Action dated Jan. 9, 2018, for U.S. Appl. No. 14/602,486, of Fern, A.J., et al., filed Jan. 22, 2015.
Notice of Allowance dated Jan. 19, 2018, for U.S. Appl. No. 14/491,965, of Poursartip, A., et al., filed Sep. 19, 2014.
Non-Final Office Action dated Mar. 8, 2018, for U.S. Appl. No. 14/522,287, of Cieri, M.M, et al., filed Oct. 23, 2014.
Notice of Allowance dated May 2, 2018, for U.S. Appl. No. 15/725,591, of Poursartip, A., et al., filed Oct. 5, 2017.
Final Office Action dated Oct. 3, 2018, for U.S. Appl. No. 14/522,287, of Cieri, M.M, et al., filed Oct. 23, 2014.
Non-Final Office Action dated Oct. 5, 2018, for U.S. Appl. No. 16/111,278, of Poursartip, A., et al., filed Aug. 24, 2018.

(56) References Cited

OTHER PUBLICATIONS

Non-Final Office Action dated Oct. 18, 2018, for U.S. Appl. No. 14/676,678, of Scott, J.B., et al., filed Apr. 1, 2015.
Advisory Action dated Dec. 13, 2018, for U.S. Appl. No. 14/522,287, of Cieri M., M., et al., filed Oct. 23, 2014.
Non Final Office Action dated Jan. 25, 2019, for U.S. Appl. No. 14/602,486, of Fern, A.J., et al., filed Jan. 22, 2015.
First Action Interview Office Action dated Jun. 17, 2021, for U.S. Appl. No. 16/596,903, of Poursartip, A., et al., filed Oct. 9, 2019.
Pre-Interview First Office Action dated Apr. 5, 2021, for U.S. Appl. No. 16/596,903, of Poursartip, A., et al., filed Oct. 9, 2019.
Notice of Allowance dated Apr. 21, 2021, for U.S. Appl. No. 16/808,860, of Poursartip, A., et al., filed Mar. 4, 2020.
"Merchant Financing System Cash Advance", Google Search, dated Apr. 5, 2022, pp. 1-2.
"Search Strategy From Dialog", Scientific and Technical Information Center, ProQuest, dated Apr. 6, 2022, pp. 1-4.
Non-Final Office Action dated Apr. 11, 2022, for U.S. Appl. No. 16/596,903, of Poursartip, A., et al., filed Oct. 9, 2019.
Notice of Allowance dated Feb. 24, 2022, for U.S. Appl. No. 16/658,198, of Scott, J.B et al., filed Oct. 21, 2019.
Advisory Action dated Mar. 9, 2022, for U.S. Appl. No. 16/596,903, of Poursartip, A., et al., filed Oct. 9, 2019.
EIC Search Report, STIC, Completed on Apr. 14, 2022, 25 pages.
Supplemental Notice of Allowance dated Jul. 7, 2022, for U.S. Appl. No. 16/596,903, of Poursartip, A., et al., filed Oct. 9, 2019.
Notice of Allowance dated Jun. 20, 2022, for U.S. Appl. No. 16/596,903, of Poursartip, A., et al., filed Oct. 2019.

* cited by examiner

MACHINE LEARNING FOR DETERMINING AN API COMMUNICATION

CROSS-REFERENCE TO RELATED APPLICATION

This application is a continuation of and claims priority to U.S. patent application Ser. No. 14/602,486, filed Jan. 22, 2015, issued as U.S. Pat. No. 10,902,512, and incorporated by reference herein.

BACKGROUND

Mobile payment systems allow individuals and merchants to accept debit and credit cards on their smartphone, tablet, or other mobile computing device. Some mobile payment systems include a payment card reader that reads and transmits payment card information to a connected mobile computing device. The mobile computing device then transmits the payment card information and other transaction information to a payment processing system to be processed. Typically, this information is transmitted over an internet connection and stored for later batch transmission if an internet connection is not available.

A merchant using a mobile payment system may desire additional funds, but may not desire to fill out a loan application, be subjected to a credit check, or be forced to make regular loan payments. Similarly, a financial institution may desire to provide its clients with a more convenient and way to obtain capital than filling out loan applications and making payments, while increasing the likelihood that the funds will be repaid.

BRIEF DESCRIPTION OF THE DRAWINGS

The techniques described herein are illustrated by way of example, and not by way of limitation, in the figures of the accompanying drawings, in which like reference numerals are used to refer to similar elements.

Figure 1:
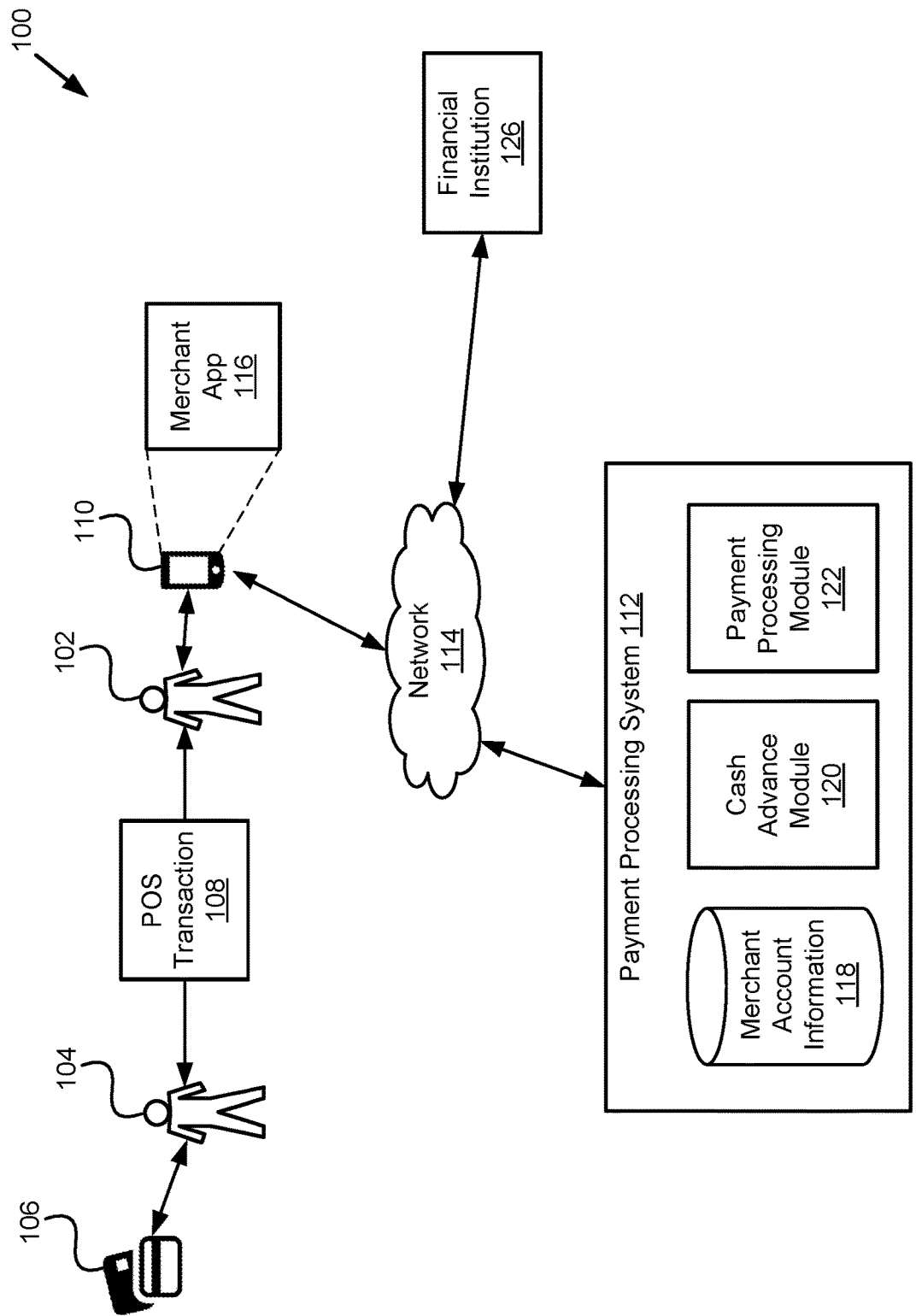
FIG. 1 illustrates an example architecture of a payment communication system for enabling transactions between merchants and buyers and allowing third-party merchant financing.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Various embodiments of the disclosure are discussed in detail below. While specific embodiments are discussed, it should be understood that this is done for illustration purposes only. It will be recognized that other components and configurations may be used without parting from the spirit and scope of the disclosure.

Systems and methods in accordance with various embodiments of the techniques described in the present disclosure overcome one or more of the above-referenced and other deficiencies in conventional approaches to providing financing, e.g., cash advances, loans, or the like, to merchants. It will be recognized, that the techniques discussed herein can apply to various financing methods, such as cash advances and loans, although one or the other may be used for descriptive purposes in the examples below. The techniques disclosed herein, whether discussed in the examples as cash advance techniques or loan techniques, can be practiced with equal applicability as a cash advance or loan. In particular, various embodiments of the present disclosure can provide a method for evaluating financial transactions conducted by a merchant through a payment processing system and, based on the evaluation, providing the merchant with one or more offers of financing. Various embodiments of the present disclosure may also provide a method for third-party financial institutions to calculate financing terms (e.g., merchant cash advance (MCA) terms, loan terms, or the like), advance funds, and receive repayment directly from financial transaction funds. The determination of whether a merchant qualifies for a financing offer can be based entirely on an evaluation of the merchant's previously conducted financial transactions through a payment processing system. In other words, the merchant need not complete applications for requesting the cash advance or provide a credit check. For example, over the previous year, the merchant may have conducted financial transactions through the payment system that total $100,000 in payment volume. Based on this payment volume and various other factors associated with the merchant, a determination can be made to offer the merchant a cash advance of $8,000 and an $800 fee for the cash advance being offered.

Thus, the merchant would receive a cash advance of $8,000 and would have to pay back the financer, e.g., a payment processing system and/or a financial institution, a total amount of $8,800, i.e., the $8,000 cash advance and the $800 fee. This amount can be collected by a payment processing system as a fraction of the amounts collected by the merchant from future financial transactions conducted through the payment processing system. To accept the offer, the merchant can select an option, for example, through a financing interface provided by the payment system. Once the offer is accepted, the merchant can be provided the cash advance through an electronic deposit made by a payment processing system and/or a financial institution (e.g., a lender, bank, second payment processing system, etc.) in a financial account of the merchant.

After the cash advance is disbursed, each time the merchant conducts a financial transaction through the payment processing system, the payment processing system will deduct a specified portion, e.g., 10 percent, from the amount charged in the financial transaction. For example, if the merchant conducts a financial transaction in the amount of $50.00, then, while processing the financial transaction, the payment system will automatically deduct $5.00, and apply that amount to the amount owed by the merchant, i.e., $8,800. In other words, at a rate of 10 percent, the merchant will be done repaying the amount owed once the merchant has reached $88,000 in financial transactions conducted through the payment system. In some embodiments, the payment system can be configured to deduct the repayment amount, e.g., 10 percent, from a group of financial transactions conducted by the merchant through the payment system over a particular period of time, e.g., daily, weekly, bi-weekly, monthly, or yearly. In some embodiments, the payment processing system can collect a set amount (e.g., $5, $10, etc.) over a particular period of time.

A third-party financial institution may make use of the eligibility calculation and repayment collection capabilities described herein by interfacing with the payment processing system via one or more APIs. For example, a server connected with a third-party financial institution may interface with a server associated with the payment processing system to send and receive various information (e.g., merchant financial history, MCA term calculation requests, MCA terms, approved cash advance amounts, payment information, etc.). Various embodiments of methods for performing these operations are described in more detail herein.

The approaches described in this specification can allow merchants to obtain financing without having to go through a typical loan application process. Merchants can also obtain financing in a timelier manner than having to fill out loan applications and obtain funding upon successful completion of the loan process. Other advantages, variations, and functions are described and suggested below as may be provided in accordance with the various embodiments.

Merchant cash advance (MCA) terms may include various terms and conditions relating to providing a cash advance to a merchant. In some embodiments, the MCA terms include an approved cash advance amount, repayment terms, repayment amount, a repayment duration, an interest rate, a processing fee, and various other terms relating to repayment, conditions, collection, etc. For example, the approved cash advance amount may be all or a portion of a target cash advance amount (e.g., a cash advance amount requested by a merchant or a financial institution). The repayment amount may include a portion of financial transactions processed by a payment processing system, such as a percentage or a recurring or periodic fee as described elsewhere herein. In another example, the MCA terms may include a fee for the cash advance, such as a set percentage of the cash advance amount, an interest rate, or a flat fee.

A cash advance may include any transfer of money, for example via wire transfer, check, payment credit, etc.

FIG. 1 illustrates an example architecture of a payment communication system 100 for enabling transactions between merchants 102 and buyers 104. In the example of FIG. 1, a buyer 104 may use any of a variety of payment cards 106 when participating in a point-of-sale (POS) transaction 108 with a merchant 102. In some embodiments, the payment cards 106 may include one or more magnetic stripes for providing payment card and buyer information when swiped in a card reader. In other embodiments, other types of payment cards may be used, for example smart cards having a built in integrated circuit including a memory chip, a radio frequency identification tag, and the like.

The payment communication system 100 in the example of FIG. 1 illustrates a merchant device 110 associated with the merchant 102 that participates in the payment service provided by a service provider. The merchant device 110, as discussed elsewhere herein, may be any appropriate device configured to send and receive requests, messages, voice calls or other types of information over the network 114. In some embodiments the merchant device 110 may be a computing device (e.g. a mobile computing device) such as a smartphone or a tablet. In some embodiments, the merchant device 110 could be any device with a cellular connection and a communication port, such as an audio input/output port.

Each merchant device 110 may optionally include an instance of a merchant application 116 executed on the merchant device 110. The merchant application 116 may provide POS functionality to enable the merchant 102 to accept payments at a POS location using the merchant device 110. The merchant application 116 on the merchant device 110 may send transaction information via data network 114 (e.g., the internet) to the payment processing system 112, e.g., as the transaction is being conducted at the POS location. As further explained in reference to FIG. 4, the transaction information may include information regarding the time, place, and the amount of each respective transaction, information related to the item acquired, payment card information, as well as additional information, such as buyer information.

As depicted in FIG. 1, the merchant device 110 may communicate with the payment processing system 112 via a data network 114. As discussed in greater detail herein, the network 114 may be coupled with or include portions of a telecommunications network for sending data and/or making voice calls using a variety of different communication protocols. Similarly, in some embodiments, the merchant device 110 may communicate with the financial institution 126.

The financial institution 126 may be a financial institution such as a bank, a lender, a second payment processing system. In some embodiments, the financial institution 126 may be a lender with its own clients (e.g., merchants who have an account with the lender) or may wish to lend to clients of the payment processing system 112 (e.g., merchants who have an account with and process payments through the payment processing system 112). For example, a lender may have the funds to lend to a merchant, but may not have the ability and/or information about the merchant to calculate MCA terms (e.g., according to the description herein). The lender may also not have the ability to collect repayment from the processed transactions (e.g., according to the description herein). The lender may therefore communicate via one or more APIs exposed by the payment processing system 112 to request that the cash advance module 120 determine MCA terms and/or that the payment processing module 122 collect repayment funds according to the MCA terms.

In some embodiments, the financial institution 126 may be a second payment processing system with its own clients (e.g., merchants that have an account with the second payment processing system, merchants that process payments through the second payment processing system, etc.). However, while the second payment processing system may be able process financial transactions and receive repayment from the financial transactions (e.g., according to the methods described herein), the second payment processing system may not have the funds to extend capital to its merchants or the ability to determine MCA terms.

The payment processing system 112 enables a payment service provider to provide a payment service in which merchants 102 are able to conduct POS transactions 108 with a plurality of buyers 104, such as for selling services and/or products to the buyers 104. The payment processing system 112 may include a payment processing module 122 that receives transaction information for processing payments made through a merchant application 116, a cash advance module that determines whether a merchant qualifies for a financing offer, and merchant account information 118 including a financial history for a merchant. The payment processing system 112 and its components are described in further detail in reference to FIG. 5.

The cash advance module 120 is configured to determine whether a merchant qualifies for a financing offer, e.g., a cash advance, by evaluating various factors associated with the merchant. Some of these factors can be based, in part, on evaluating financial transactions conducted by the merchant through the payment processing module 122. The cash advance module 120 may also include one or more application programming interfaces (API) for facilitating communication between the cash advance module 120 and other components of the payment communication system 100, such as the financial institution 126.

The cash advance module 120 can determine whether a merchant is eligible for a financing offer, the amount of the cash advance, a fee for the cash advance, e.g., a percentage of the cash advance or a fixed fee, and a rate for repayment for the cash advance and the fee, e.g., a fixed amount or a percentage, to be deducted from financial transactions conducted by the merchant. These determinations can be made, for example, by applying various machine learning techniques, e.g., ensemble learning methods.

In various embodiments, the cash advance module 120 utilizes a classifier, for example, based on a random forest approach, to determine whether a merchant qualifies for a financing offer. The classifier can be trained using training data that describes, for various merchants, respective payment history, the respective type of business, a respective gross payment volume (GPV) over a particular time period, the growth of the merchant's GPV over a particular time period, e.g., month over month growth, and whether the merchant has a brick-and-mortar store, to name some examples.

To determine whether a particular merchant qualifies for a financing offer, the cash advance module 120 can utilize the classifier to determine whether factors describing the merchant qualify the merchant for a cash advance. As mentioned, these factors can be, for example, the merchant's payment history, the type of business, and a GPV over a particular time period, e.g., over the past fiscal quarter or year. These factors can be determined from information aggregated by the payment processing module 122, retrieved from the merchant account information 118, received from the financial institution 126, etc.

The cash advance module 120 can also determine the amount of the financing offer, the fee for the financing offer, and the rate of repayment, using similar techniques. For example, the cash advance module 120 can apply normal regression analysis on the merchant's previous financial transactions conducted by the merchant through the payment processing module 122, the financial institution 126, another payment processing system, etc. to make such determinations. In some embodiments, the fee for the cash advance is based on a specified percentage, e.g., 14 percent, of the cash advance. In some embodiments, the rate of repayment is a specified percentage, e.g., 10 percent. In some embodiments, the rate is determined based on targeting a 10-month repayment model. This model can be determined by forecasting the merchant's GPV for the subsequent year.

Once the cash advance module 120 determines that the merchant qualifies for a financing offer, the details of the financing offer can be sent to the merchant and/or sent to the financial institution 126 via an API. Depending on the embodiment, the offer details can be sent to the computing device and/or server (e.g., associated with the financial institution 126) over a network, e.g., the Internet, through a web-based environment, as described above, using the API, or may be sent to the merchant through electronic communication, e.g., by e-mail or a text message.

The merchant can then accept the financing offer, as described above. Once the offer is accepted, the cash advance module 120 can instruct the payment processing system 112 and/or the financial institution 126 to disburse funds, to the merchant, in the amount specified in the offer and/or the MCA terms. The payment system 112 and/or the financial institution 126 can access merchant account information 118 that describes financial account information, e.g., a routing number for a checking account, for the merchant. In some embodiments, the payment processing system 112 electronically deposits the funds in the merchant's financial account with a bank (which may or may not be the financial institution 126). The merchant can then access the funds directly from their financial account. Other approaches to providing the merchant with the cash advance are possible including, for example, providing the merchant with a financial payment card having a pre-set spending limit in the amount of the cash advance.

The payment processing module 122 is configured to process financial transactions between the merchant 102 and customers 104, as described below in reference to FIG. 4. In various embodiments, while processing financial transactions for the merchant 102, the payment processing module 122 is also configured to deduct a portion of the merchant's earnings from these financial transactions until the amount of financing provided to the merchant, together with the fee for the financing, is collected. As mentioned, the amount deducted from financial transactions can be based on a rate for repayment for the cash advance and the fee, as specified in the MCA terms, e.g., a fixed amount deducted from each transaction, e.g., $5, or a percentage, e.g., 10 percent, to be deducted from financial transactions conducted by the merchant. As mentioned, these deductions can be performed on a per-transaction basis or from financial transactions conducted by the merchant over a certain time period, e.g., hourly, daily, weekly, bi-weekly, monthly, or yearly.

In some embodiments, the cash advance module 120 may determine that the merchant qualifies up to a maximum amount of financing. In such embodiments, the merchant can request an amount of financing that is the same or less than the maximum amount of financing (e.g., a target cash advance amount). In some embodiments, the merchant may request an amount of financing that is higher than the amount of financing that the merchant was pre-qualified to receive. In such embodiments, the cash advance module 120, alone or in combination with human feedback, can evaluate the request to determine whether the merchant should receive the requested higher amount of financing.

The cash advance module 120 is configured to evaluate respective factors associated with merchants, as described above, to determine whether any of those merchants pre-qualify for respective financing offers. Naturally, the factors for each merchant will vary based on the different types of financial transactions performed by that merchant and the various attributes of the merchant. Thus, the cash advance module 120 is able to generate custom financing offers for each merchant. Financing offers for each merchant can be determined automatically without merchants necessarily requesting such offers. Once determined, these offers can be provided to the merchants, as described above, without the merchant having to request the cash advance.

The payment processing system 112 may also include merchant account information 118, which may be stored on a data storage device. To accept electronic payments for POS transactions, the merchant 102 may create a merchant account on the payment processing system 112 by providing information describing the merchant 102, including, for example, merchant name, contact information (e.g., telephone numbers, the merchant's address, and one or more financial accounts to which funds collected from buyers will be deposited). The data storage device is an information source (e.g., a non-transitory computer-readable medium) for storing and providing access to data. The data stored (e.g., the merchant account information 118) by the data storage device may be organized and queried using various criteria including any type of data stored by it and may include data tables, databases, or other organized collections of data. The components of the payment processing system 112 may be communicatively coupled to the data storage device and may access (e.g., read, write, modify, delete, etc.) the data stored therein.

The merchant account information 118 stored in the data storage device may include financial account information (e.g., routing number for a checking account, balance, etc.), merchant financial history, merchant finances, merchant financial history and related MCA terms for past merchants, etc. Merchant financial history may include financial transaction data, account balance data, merchant attribute data, and other types of data, which are contemplated herein. For example, financial transaction data may include a history (frequency, amount, regularity, etc.) of financial transactions processed through the payment processing system 112, the financial institution 126, etc. The account balance data may include account balances for the merchant at one or more of the payment processing system 112, the financial institution 126, and/or one or more other financial institutions. Merchant attribute data may include the type of merchant (taxi service, food cart, retail store), whether the merchant has a brick-and-mortar store, etc., which may be reflective how prone the merchant business is to continue operations and be able to repay a cash advance.

The merchant account information 118 may be received from the payment processing module 122, the financial institution 126, and/or other possible third-party information sources (e.g., financial institutions not part of the system 100). In some embodiments, the merchant account information 118 is aggregated by the payment processing module 122 and reflects the financial transactions processed by the payment processing module 122 through the payment processing system 112. For example, the merchant account information 118 may reflect the POS transactions 108 processed by the payment processing system 112 via the merchant device 110. In some embodiments, the merchant account information is received from the financial institution 126 via an API. For example, the financial institution may send merchant financial information to the payment processing system 112 regarding a merchant who holds an account with the financial institution 126. The financial institution 126 may lack the expertise and/or capability to determine MCA terms for the merchant as accurately or efficiently as the payment processing system 112, so the financial institution 126 communicates merchant account information 118 to the payment processing system 112 for processing by the cash advance module 120. The financial institution 126 may request permission from the merchant to allow the financial institution 126 to share certain merchant account information with its partners (e.g., the payment processing system 112).

As discussed elsewhere herein, the cash advance module 120 accesses the merchant account information 118 and determines MCA terms based at least on the merchant account information. For example, the payment processing system 112 may receive a request to determine MCA terms and merchant account information via the API from a financial institution 126, which the cash advance module 120 may use to calculate MCA terms for the particular merchant. In some embodiments, the cash advance module 120 uses information collected from other merchants who use the payment processing system 112 to help determine eligibility and MCA terms for the merchant. For example, the payment processing system 112 may compare the merchant to other merchants operating a similar business to determine likely revenue and/or likely repayment of the case advance. In response to the request, the payment processing system 112 may communicate the MCA terms to the financial institution 126, transfer money to the financial institution 126, transfer money to the merchant, etc. as described herein.

The processes described in FIGS. 2A, 2B, 2C, and 3 are each illustrated as a collection of blocks in logical flow diagrams, which represent a sequence of operations, some or all of which can be implemented in hardware, software, or a combination thereof. The order in which the blocks are described should not be construed as a limitation. Any number of the described blocks can be combined in any order and/or in parallel to implement the processes, or alternative processes, and not all of the blocks need be executed. For ease of description, the processes are described with reference to the environments, architectures and systems described in the examples herein, although the processes may be implemented in a wide variety of other environments, architectures and systems.

Figure 2A:
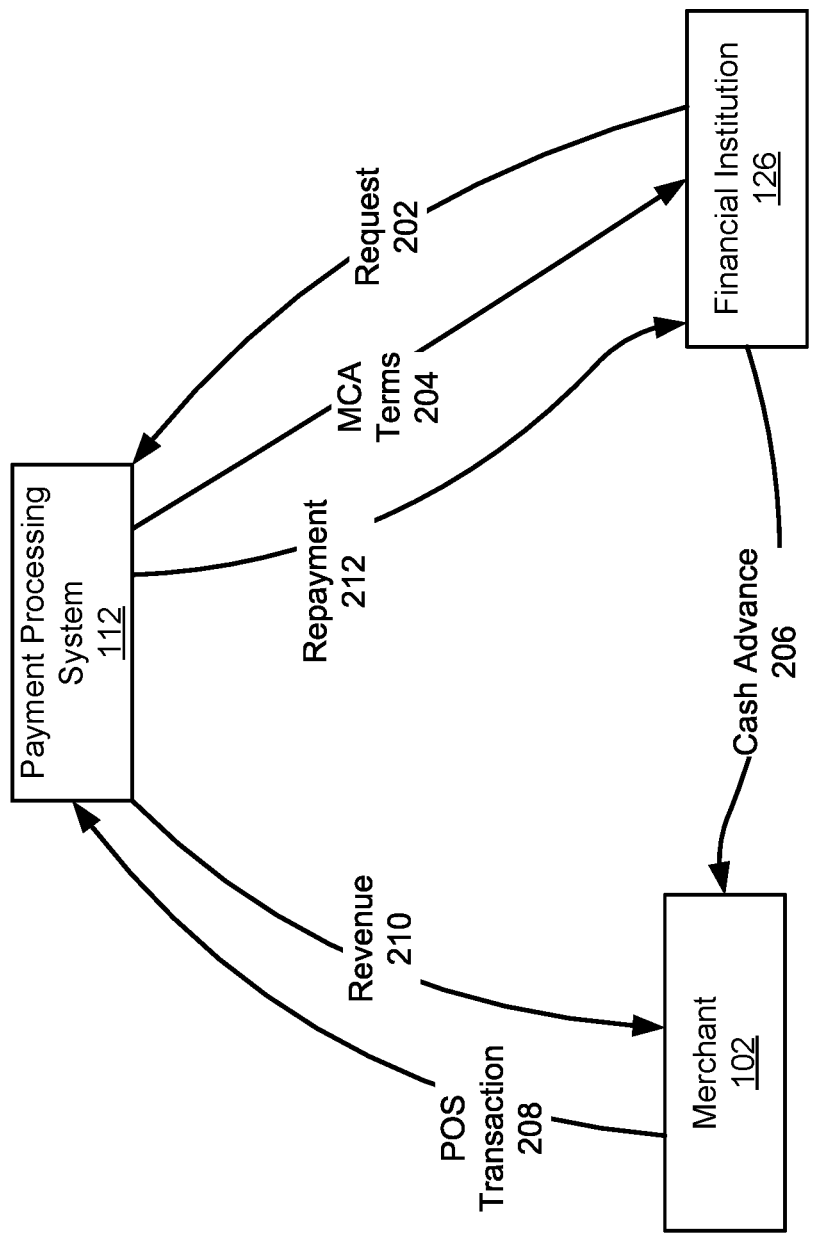
FIGS. 2A-2C are data flow diagrams of example processes for enabling third-party merchant financing according to the present disclosure.

FIG. 2A is a data flow diagram depicting an example of information flow and the flow of funds (e.g., a cash advance, repayment, etc.) between a payment processing system 112, a financial institution 126, and a merchant 102 according to one embodiment. In one embodiment, the merchant 102 has an existing relationship with both the payment processing system 112 (e.g., the merchant 102 uses the payment processing system 112 to process POS transactions) and the financial institution (e.g., the merchant 102 has an account with the financial institution where proceeds from POS transactions are deposited). In other embodiments, the merchant 102 may have an existing relationship with only one of the payment processing system 112 and the financial institution.

In some embodiments, the merchant may approach the financial institution 126 for financing. For example, in response to the merchant requesting financing, the financial institution 126 may send a request 202 for MCA terms to the payment processing system 112 via an API exposed by the payment processing system 112. In some embodiments, the request 202 includes a merchant financial history, target cash advance amounts, and other identifying information for the financial institution 126 and/or the merchant 102. In some embodiments, if the merchant has a relationship with the payment processing system, the payment processing system 112 maintains a merchant financial history in the merchant account information 118 and therefore a merchant financial history may not be included in the request 202. In response to receiving the request 202, the cash advance module 120 in the payment processing system 112 determines MCA terms for the cash advance for the merchant 102 as described herein. In some embodiments, the payment processing system 112 may send an initial request to the financial institution 126 requesting that the financial institution 126 provide a cash advance for the merchant 102. In such a case, the request 202 depicted in the example of FIG. 2A may be omitted and the payment processing system 112 sends the request to the financial institution 126 along with the MCA terms 204. This may happen, for example, when the merchant 102 is a client of a payment processing system 112 with no capital to extend a cash advance to the merchant 102 but partners with the financial institution 126 to provide funds for the cash advance.

After determining MCA eligibility and terms for the merchant as discussed herein, the payment processing system 112 sends the MCA terms 204 to the financial institution 126. In response to receiving the MCA terms, the financial institution 126 may disburse cash advance funds 206 to the merchant 102 (e.g., credit an account associated with the merchant, wire transfer the cash advance to a financial account associated with the merchant, send a check to the merchant, or the like).

The merchant 102 conducts POS transactions 208 with buyers that are processed by the payment processing system 112 as described herein. The payment processing system 112 collects repayment according to the MCA terms from the POS transactions 208. For example, as described elsewhere herein, the payment processing system 112 collects a portion (e.g., a certain percentage, a periodic amount, etc.) from each POS transaction 208 for repayment of the cash advance.

The payment processing system 112 provides a portion of the POS transaction 208 to the financial institution 126 for repayment 212 of the cash advance 206 and the remaining revenue 210 from the POS transaction 208 to the merchant 102. In some embodiments, the payment processing system 112 may also collect a portion of the POS transaction 208 as a fee (e.g., a referral fee, a processing fee, etc.) for processing the financial transaction and/or calculating the MCA terms. Such fees for processing and/or calculating can be communicated by the payment processing system 112 to financial institution 126 in MCA terms 204, in one embodiment.

Figure 2B:
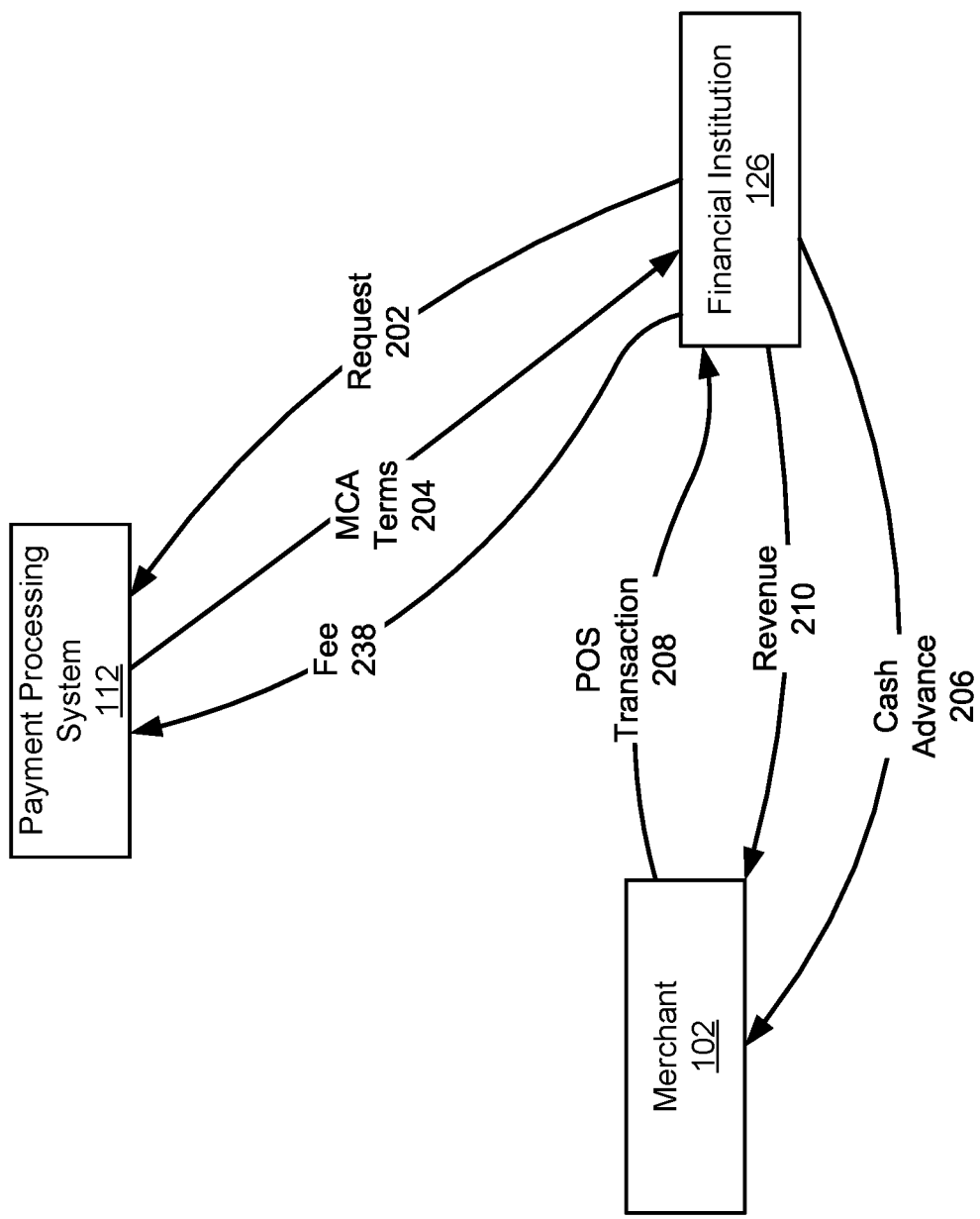

FIG. 2B is a data flow diagram depicting an example of information flow and the flow of funds (e.g., a cash advance, repayment, etc.) between a payment processing system 112, a financial institution 126, and a merchant 102 according to one embodiment. In the example data flow of FIG. 2B, the financial institution 126 may include payment processing capabilities and process POS transactions for the merchant 102 and have capital to provide a cash advance to the merchant 102. However, the financial institution 126 may not have the capability to determine MCA terms for the merchant and may send a request 202 for MCA terms from the payment processing system 112 via an API. In some embodiments, the request 202 includes a merchant financial history, target cash advance amounts, and other identifying information for the financial institution 126 and/or the merchant 102. In response to receiving the request 202, the cash advance module 120 in the payment processing system 112 determines MCA terms for the cash advance for the merchant 102 as described herein.

After determining MCA eligibility and terms for the merchant as discussed herein, the payment processing system 112 sends the MCA terms 204 to the financial institution 126. In response to receiving the MCA terms, the financial institution 126 may disburse cash advance funds to the merchant 102 (e.g., credit an account associated with the merchant, wire transfer the cash advance to a financial account associated with the merchant, send a check to the merchant, or the like).

The merchant 102 conducts POS transactions 208 with buyers that are processed by the financial institution 126. The financial institution 126 collects repayment according to the MCA terms from the POS transactions 208. For example, as described elsewhere herein, the financial institution 126 collects a portion (e.g., a certain percentage, a periodic amount, etc.) from each POS transaction 208 for repayment of the cash advance.

The financial institution 126 retains the portion of the POS transaction 208 for repayment of the cash advance and provides the remaining revenue 210 from the POS transaction 208 to the merchant 102. The financial institution 126 may also send a fee 238 (e.g., a referral fee, a processing fee, etc.) to the payment processing system 112 for calculating the MCA. In one embodiment, the fee may be a lump sum provided by the financial institution 126 to the payment processing system 126. In another embodiment, the fee may be collected as a portion of POS transactions 208 processed by the financial institution.

Figure 2C:
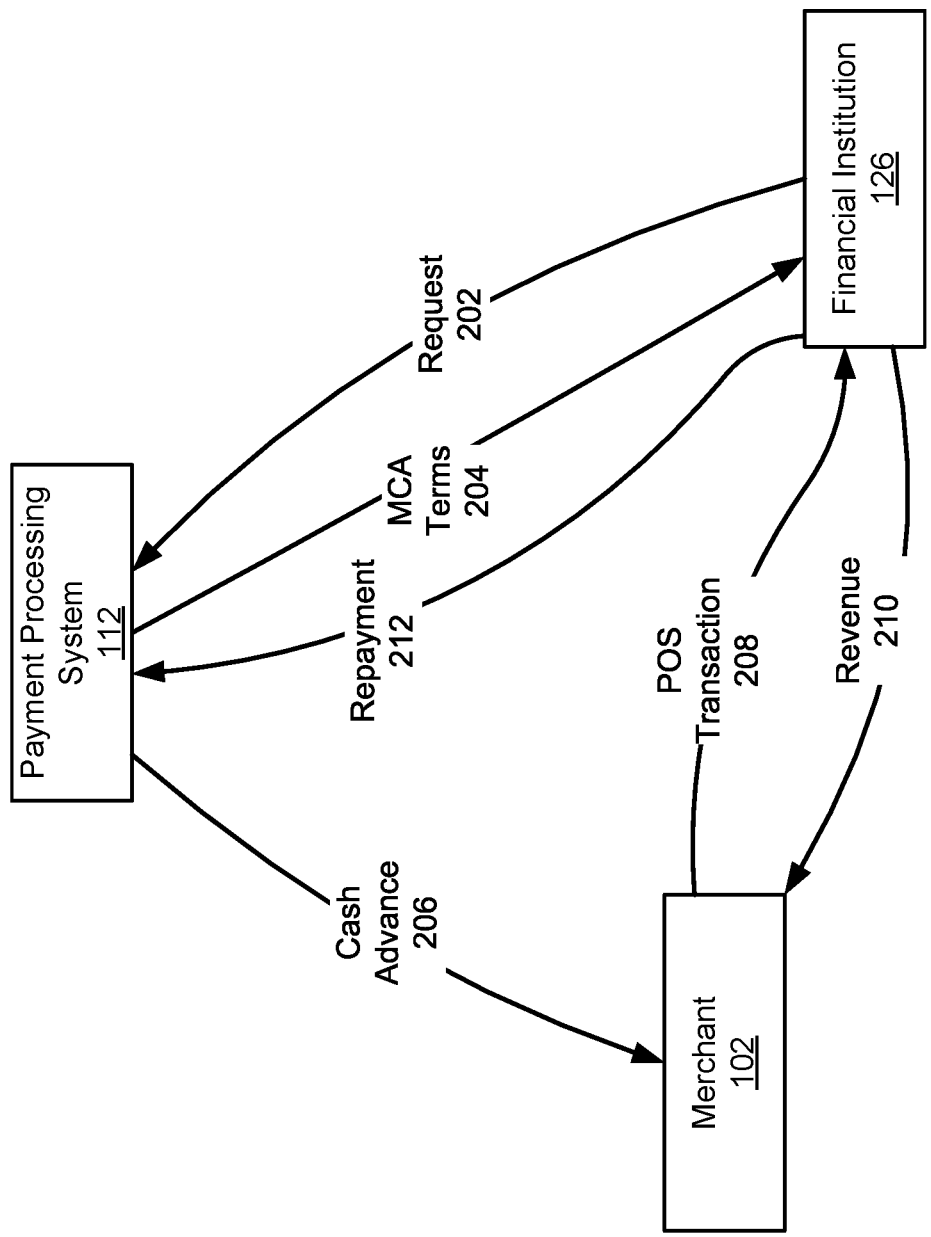

FIG. 2C is a data flow diagram depicting an example of information flow and the flow of funds (e.g., a cash advance, repayment, etc.) between a payment processing system 112, a financial institution 126, and a merchant 102 according to one embodiment. In the example data flow of FIG. 2C, the financial institution 126 may include payment processing capabilities and process POS transactions for the merchant 102. However, the financial institution 126 may not have the capability to determine MCA terms for the merchant and may send a request 202 for MCA terms and a cash advance for the merchant 102 from the payment processing system 112 via an API. In some embodiments, the request 202 includes a merchant financial history, target cash advance amounts, and other identifying information for the financial institution 126 and/or the merchant 102. In response to receiving the request 202, the cash advance module 120 in the payment processing system 112 determines MCA terms for the cash advance for the merchant 102 as described herein.

After determining MCA eligibility and terms for the merchant as discussed herein, the payment processing system 112 sends the MCA terms 204 to the financial institution 126. In response to receiving authorization from the financial institution 126, the payment processing system 112 may disburse cash advance funds to the merchant 102 (e.g., credit an account associated with the merchant, wire transfer the cash advance to a financial account associated with the merchant, send a check to the merchant 208, or the like).

The merchant 102 conducts POS transactions 208 with buyers that are processed by the financial institution 126. The financial institution 126 collects repayment according to the MCA terms from the POS transactions 208. For example, as described elsewhere herein, the financial institution 126 collects a portion (e.g., a certain percentage, a periodic amount, etc.) from each POS transaction 208 for repayment of the cash advance. The financial institution 126 provides a portion of the POS transaction 208 to the payment processing system 112 for repayment 212 of the cash advance and the remaining revenue 210 from the POS transaction 208 to the merchant 102.

Figure 3:
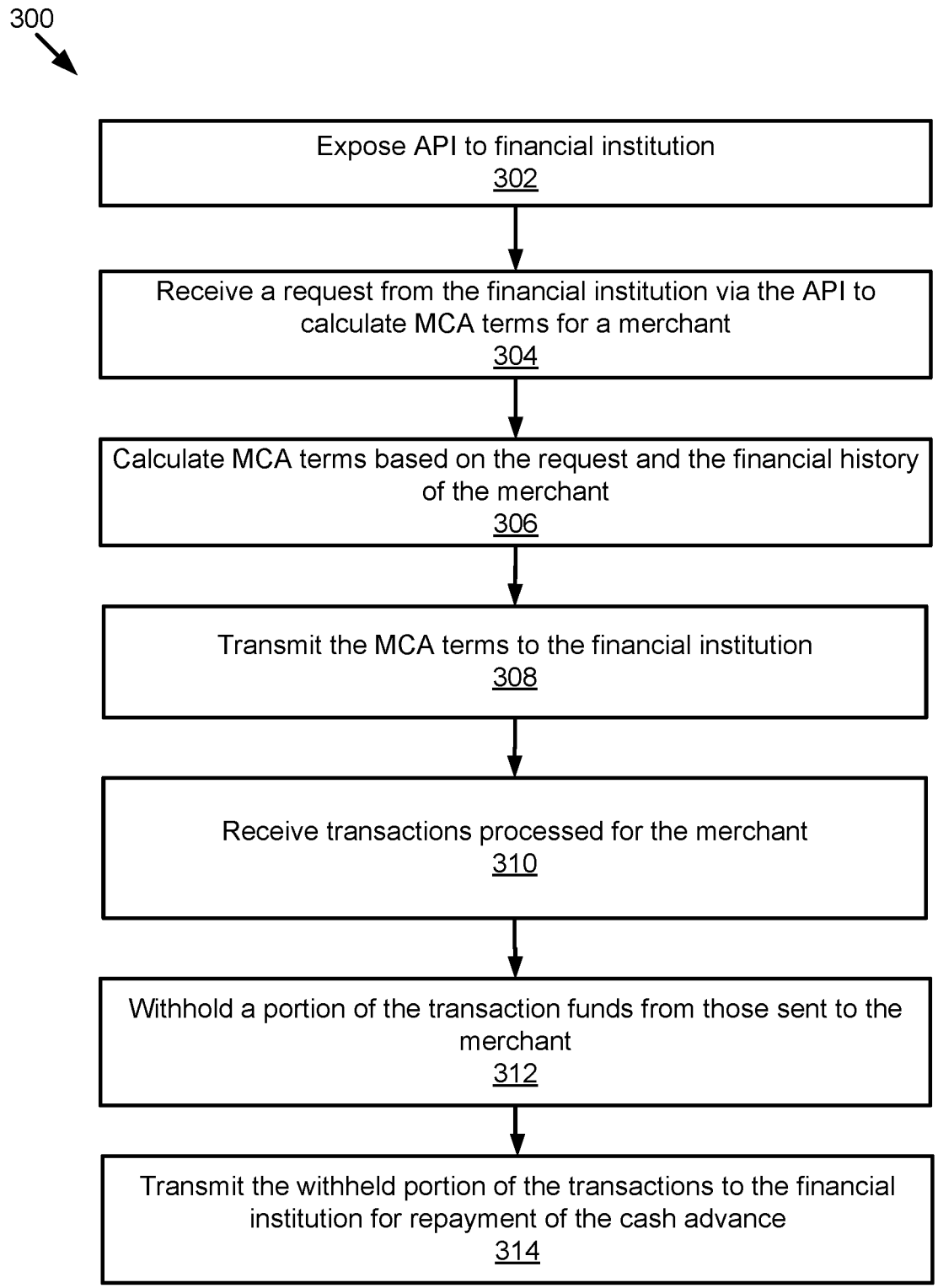
FIG. 3 is a block diagram of one embodiment of an example process for enabling third-party merchant financing according to the present disclosure.

FIG. 3 is a block diagram of an example process 300 for enabling third-party merchant financing. At 302, the payment processing system 112 exposes one or more APIs to a financial institution 126. For example, the API(s) allow a server associated with the financial institution 126 to communicate requests, MCA terms, merchant financial history, and other information with a server associated with the payment processing system 112.

At 304, the payment processing system 112 receives a request from the financial institution 126 via the API to calculate MCA terms for a merchant and at 306, the cash advance module 120 in the payment processing system 112 calculates MCA terms based on the request and the financial history of the merchant and other merchants who use the payment processing system. At 308, the payment processing system 112 transmits the MCA terms to the financial institution.

At 310, the payment processing system 112 receives and processes POS transactions for a merchant. At 312, the payment processing system 112 withholds a portion of the transaction funds from those sent to the merchant. For example, a merchant may collect $10 in a POS transaction 108, withhold 10% for repayment of the cash advance according to the calculated MCA terms, and send the remaining revenue of $9 to the merchant. At 314, the payment processing system 112 transmits the withheld portion (e.g., via wire transfer, check, etc.) of the transaction to the financial institution for repayment of the cash advance.

Although the blocks in FIG. 3 refer to specific components of the system 100 performing the operations, other embodiments are possible and contemplated. For example, the financial institution can include payment processing capabilities and process POS transactions for the merchant and the repayment may be transferred from the financial institution to the payment processing system 112, or other embodiments, as described elsewhere herein.

Figure 4:
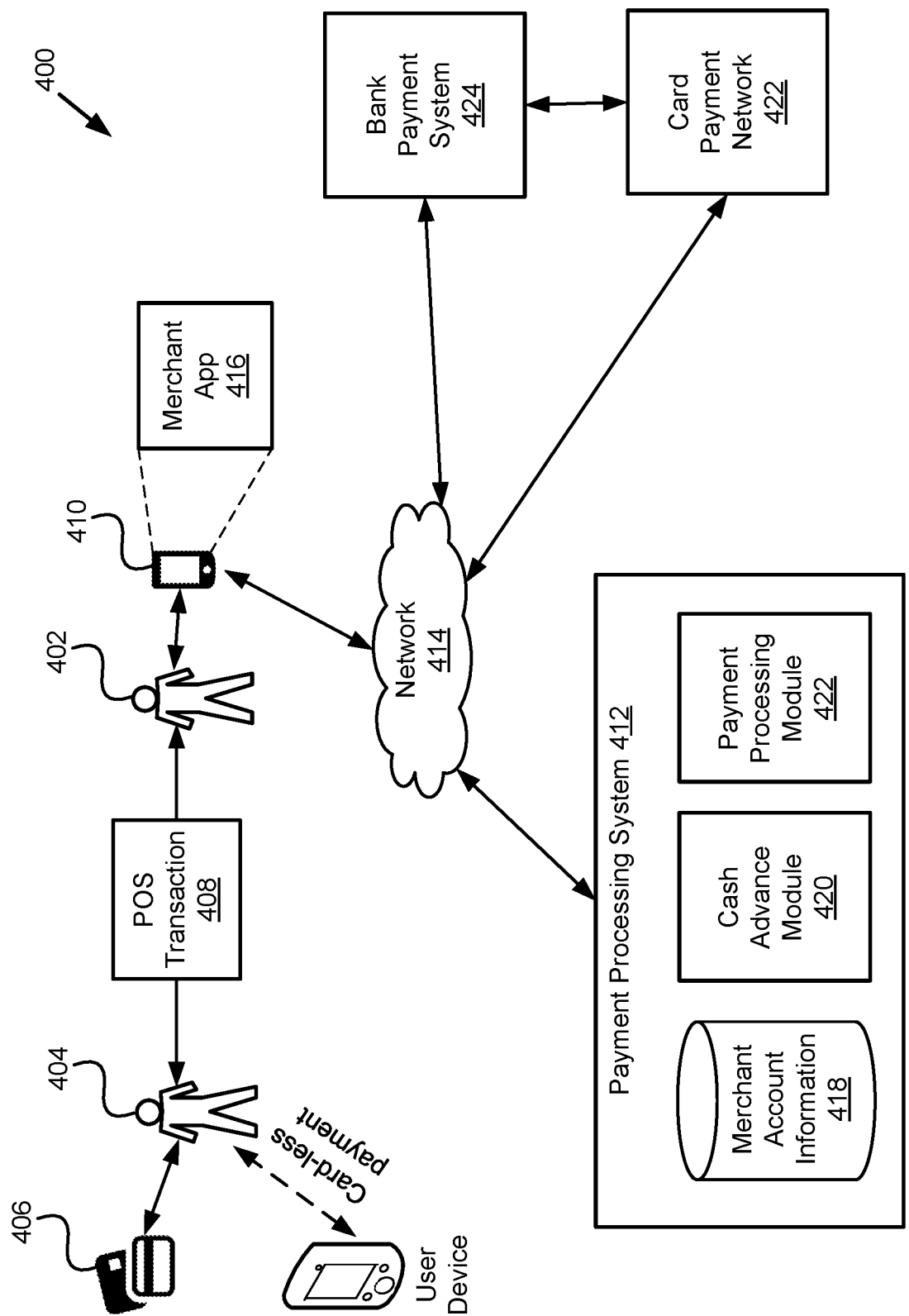
FIG. 4 illustrates an example architecture of a payment communication system for enabling transactions between merchants and buyers.
Figure 6:
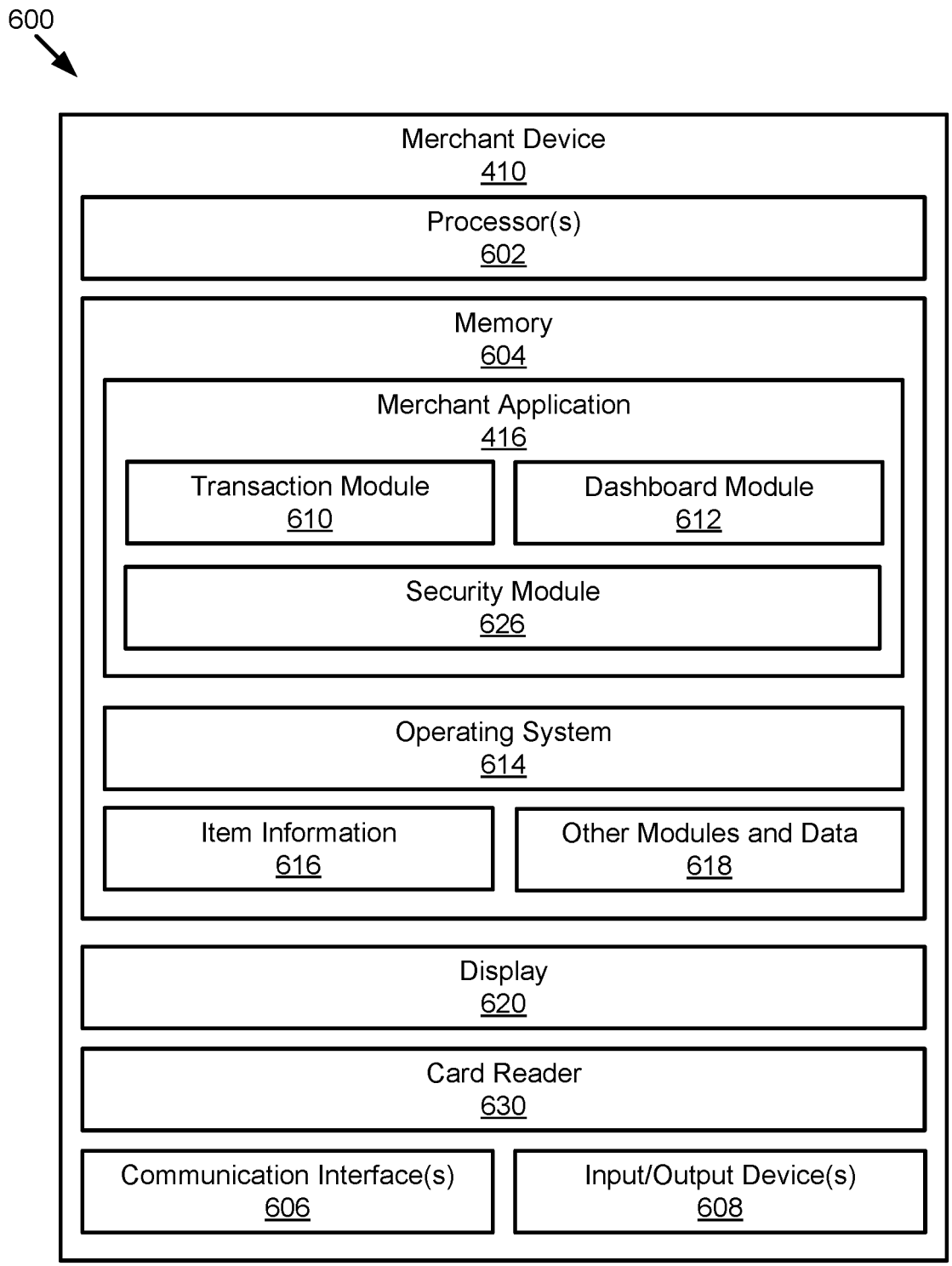
FIG. 6 illustrates an example block diagram of components of a merchant device.

FIG. 4 illustrates an example architecture of a payment communication system 400 for enabling transactions between merchants 402 and buyers 404. In the example of FIG. 4, a buyer 404 may use any of a variety of payment cards 406 when participating in a POS transaction 408 with a merchant 402. For example, a buyer 404 may typically have payment cards 406 such as credit cards, debit cards, prepaid cards, and the like, that the buyer 404 may use for conducting POS transaction 408. In some embodiments, the payment cards 406 may include one or more magnetic strips for providing payment card and buyer information when swiped in a card reader 630 (e.g., as depicted in FIG. 6). In other embodiments, other types of payment cards may be used, for example smart cards having a built in integrated circuit including a memory chip, a radio frequency identification tag, and the like.

The payment communication system 400 in the example of FIG. 4 illustrates a merchant device 410 associated with the merchant 402 that participates in the payment service provided by the service provider of the payment processing system 412. As discussed elsewhere herein, the merchant device 410 may be a computing device (e.g., a mobile computing device) able to communicate with the payment processing system 412, and with various other computing devices, through any suitable communication protocols, interfaces, and networks, including network 414. Further, the merchant device 410 may be any appropriate device operable to send and receive requests, messages, or other types of information over the network 414. Additionally, while only a single merchant device 410 is illustrated in the example of FIG. 4, in some embodiments there may be additional merchant devices depending on the number of merchants participating in the payment service.

Each merchant device 410 may include an instance of a merchant application 416 executed on the merchant device. The merchant application 416 may provide POS functionality to enable the merchant 402 to accept payments at a POS location using the merchant device 410. In some types of businesses, the POS location may correspond to a store or other place of business of the merchant, and thus, may be a fixed location that typically does not change on a day-to-day basis. In other types of businesses, however, the POS location may change from time to time, such as in the case that the merchant 402 operates a food truck, is a street vendor, a cab driver, or has an otherwise mobile business, e.g., in the case of merchants who sell items at buyers' homes, buyers' places of business, and so forth.

Accordingly, the merchant 402 and the buyer 404 may conduct a POS transaction 408 by which the buyer 404 acquires an item or service from the merchant 402 at a POS location. The merchant application 416 on the merchant device 410 may send transaction information to the payment processing system 412, e.g., as the transaction is being conducted at the POS location. In some embodiments, such as if a particular merchant device 410 is not connected to the network 414 and is therefore processing transactions offline, the transaction information may be sent in a batch at a subsequent point in time or using other suitable techniques. In some embodiments, the transaction information may be sent via SMS, MMS, or a voice call.

The transaction information may include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer may sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), any type of data that is received upon a buyer's authentication into a social network, if any, and various other types of information.

To accept electronic payments for POS transactions, the merchant 402 typically creates a merchant account on the payment processing system 412 by providing information describing the merchant including, for example, merchant name, contact information (e.g., telephone numbers, the merchant's address, and one or more financial accounts to which funds collected from buyers will be deposited). This merchant information can be securely stored by the service provider, for example, as merchant account information 418 in a secure database. Further, the merchant information may include a merchant profile created for each merchant. The merchant profile may include information about the merchant 402 and transaction information associated with transactions conducted by the merchant.

The payment processing system 412 enables a service provider to provide a payment service in which merchants 402 are able to conduct POS transactions 408 with a plurality of buyers 404, such as for selling services and/or products to the buyers 404. The payment processing system 412 may include one or more servers that are configured to process secure electronic financial transactions, e.g., payment during a POS transaction 408, by communicating with the merchant device 410, card payment networks 422, and bank or other financial institution payment systems 424. The payment processing system 412 includes a payment processing module 422 that receives transaction information for processing payments made through the merchant application 416. For example, the payment processing module 422 may receive transaction information, such as an amount of the transaction, and may verify that a particular payment card 406 can be used to pay for the transaction, such as by contacting a card clearinghouse of a card payment network 422. Furthermore, in some examples, the payment processing module 422 may redirect payment information for transactions to be made using payment cards 406 to a bank, or other financial institution, payment system 424. In other embodiments, the merchant device 410 may communicate directly with an appropriate card payment network 422 or bank payment system 424 for approving or denying a transaction using a particular payment card 406 for a POS transaction 408. Additional details of payment processing are discussed below.

As introduced above, the payment processing system 412 may be configured to communicate with one or more systems of a card payment network 422 (e.g., MasterCard®, VISA®, or the like) over the network 414 to conduct financial transactions electronically. The payment processing system 412 may also communicate with one or more bank payment systems 424 of one or more banks over the network 414. For example, the payment processing system 412 may communicate with an acquiring bank, a payment card issuing bank, and/or a bank maintaining buyer accounts for electronic payments.

A payment card acquiring bank may be a registered member of a card association (e.g., Visa®, MasterCard®, or the like), and may be part of a card payment network 422. A payment card issuing bank may issue payment cards 406 to buyers 404, and may pay acquiring banks for purchases made by cardholders to which the issuing bank has issued a payment card 406. Accordingly, in some embodiments, the systems of an acquiring bank may be included in the card payment network 422 and may communicate with systems of a payment card issuing bank to obtain payment. Further, in some embodiments, bank payment systems 424 may include systems associated with debit card issuing institutions, in which case, the systems of the debit card issuing institution may receive communications regarding a transaction in which the buyer uses a debit card instead of a credit card. Additionally, there may be systems of other financial institutions involved in some types of transactions or in alternative system architectures, and thus, the foregoing are merely several examples.

The network 414 can be a conventional type, wired or wireless, and may have numerous different configurations including a star configuration, token ring configuration, or other configurations. Furthermore, the network 414 may include a local area network (LAN), a wide area network (WAN) (e.g., the internet), and/or other interconnected data paths across which multiple devices may communicate. In some embodiments, the network 414 may be a peer-to-peer network. The network 414 may also be coupled with or include portions of a telecommunications network for sending data using a variety of different communication protocols. In some embodiments, the network 414 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 4 illustrates one network 414 coupled to the merchant device, payment processing system, card payment network, and bank, in practice one or more networks 414 can connect these entities.

Figure 5:
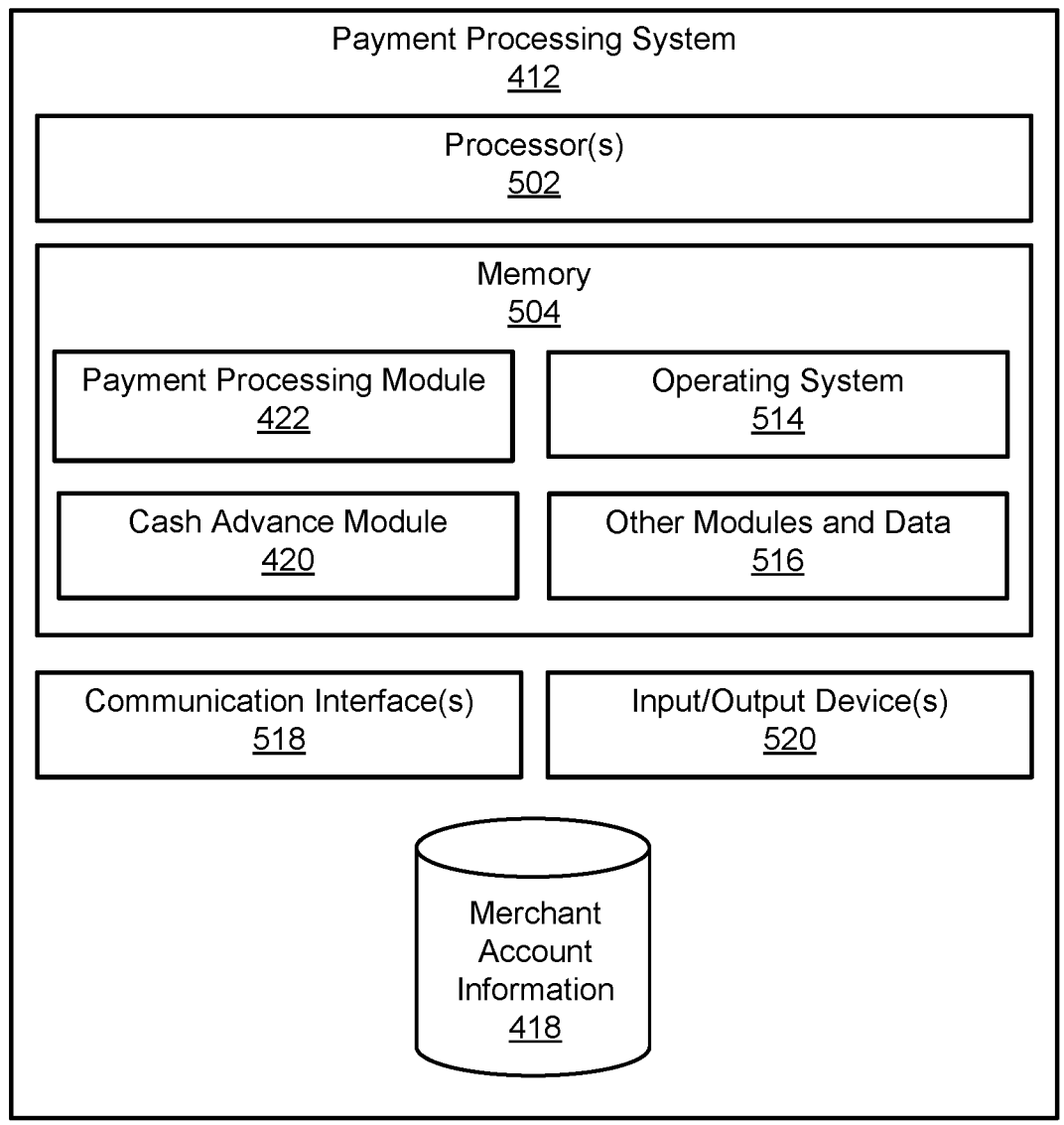
FIG. 5 illustrates an example block diagram of components of a payment processing system.

FIG. 5 is a block diagram 500 illustrating select components of an example payment processing system 412 according to some embodiments. The payment processing system 412 may be any suitable type of computing device capable of sending communications and performing the functions according to the techniques described herein and may be operated by a service provider that provides the payment processing service. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processing system 412 as being present in a single location, these components and data may alternatively be distributed across different computing devices and different locations. Consequently, the functions may be implemented by one or more computing devices, with the various functionality described above distributed in various ways across the different computing devices, to collectively implement the payment processing system 412. Multiple payment processing systems 412 may be located together or separately, and organized, for example, as virtual servers, server banks and/or server farms. The described functionality may be provided by the servers of a single entity or enterprise, or may be provided by the servers and/or services of multiple different buyers or enterprises.

In the example of FIG. 5, the payment processing system 412 includes one or more processors 502, one or more memory devices 504, one or more communication interfaces 518, and one or more input/output devices 520. These components may be similar to those described above with reference to FIG. 4 and elsewhere herein.

The memory 504 may be used to store and maintain any number of functional components or modules that are executable by the processor 502. In some embodiments, these functional components comprise instructions or programs that are executable by the processor 502 and that, when executed, implement operational logic for performing the actions and services attributed above to the payment processing system 412. Functional components of the payment processing system 412 stored in the memory 504 may include the payment processing module 422, the cash advance module 420, the operating system 514, and other modules and data 516. These components may be similar to those described with reference to FIG. 4 and elsewhere herein. In addition, the memory 504 may store data used for performing the operations described herein. Thus, the memory 504 may store merchant information 418, including the merchant profiles. Further, the payment processing system 412 may include many other logical, programmatic and physical components, of which those described above are merely examples that are related to the discussion herein.

FIG. 6 is a block diagram 600 illustrating select components of an example merchant device 410 according to some embodiments. The merchant device 410 may be any suitable type of computing device, e.g., portable, semi-portable, semi-stationary, or stationary. Some examples of the merchant device 410 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 6, the merchant device 410 includes at least one processor 602, a memory 604, one or more communication interfaces 606, and one or more input/output (I/O) devices 608. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some embodiments, the processor 602 may be one or more hardware processors and/or logic circuits of any suitable type specifically programmed or configured to execute the algorithms and processes described herein by performing various input/output, logical, and/or mathematical operations. The processor 602 can be configured to fetch and execute computer-readable processor-executable instructions stored in the memory 6604.

Depending on the configuration of the merchant device 410, the memory 604 may be an example of tangible non-transitory computer storage media (e.g., computer-readable media) and may include volatile and nonvolatile memory and/or removable and non-removable media implemented in any type of technology for storage of information such as computer-readable processor-executable instructions, data structures, program modules or other data. The computer-readable media may include, but is not limited to, RAM, ROM, EEPROM, flash memory, solid-state storage, magnetic disk storage, optical storage, and/or other computer-readable media technology. Further, in some cases, the merchant device 410 may access external storage, such as RAID storage systems, storage arrays, network attached storage, storage area networks, cloud storage, or any other medium that can be used to store information and that can be accessed by the processor 602 directly or through another computing device or network. Accordingly, the memory 604 may be computer storage media able to store instructions, modules or components that may be executed by the processor 602.

The memory 604 may be used to store and maintain any number of functional components or modules that are executable by the processor 602. In some embodiments, these functional components comprise instructions or programs that are executable by the processor 602 and that, when executed, implement operational logic for performing the actions and services attributed above to the merchant device 410. Functional components of the merchant device 410 stored in the memory 604 may include the merchant application 416. In this example, the merchant application 416 includes a transaction module 610, a dashboard module 612, and a security module 626. The transaction module 610, for example, presents an interface, such as a payment interface to enable the merchant to conduct transactions, receive payments, and so forth, as well as for communicating with the payment processing system 412 for processing payments and sending transaction information. The dashboard module 612 enables the merchant to manage the merchant's account, the merchant profile, merchant preferences, view saved or new pricing information, communicate with the payment processing system 412 regarding cash advances, and the like. The security module 626 may, as described herein, enable the merchant application 416 to encrypt and decrypt transaction information communicated between the merchant device 410 and other system components. Additional functional components may include an operating system 614 for controlling and managing various functions of the merchant device 410 and for enabling basic user interactions with the merchant device 410.

In addition, the memory 604 may also store data, data structures and the like, that are used by the functional components. For example, data stored by the memory 604 may include item information 616 that includes information about the items offered by the merchant, which may include a list of items currently available from the merchant, images of the items, descriptions of the items, prices of the items, and so forth. For instance, when the merchant 402 is setting up the merchant application 416 to accept payments for particular items offered by the merchant 402, the merchant may enter the item information 616 for the particular items. Depending on the type of the merchant device 410, the memory 604 may also optionally include other functional components and data, such as other modules and data 616, which may include programs, drivers, etc., and the data used or generated by the functional components. Further, the merchant device 410 may include many other logical, programmatic and physical components, of which those described are merely examples that are related to the discussion herein.

The communication interface(s) 606 may include one or more interfaces and hardware components for enabling communication with various other devices, such as over the network(s) 414 or directly. For example, communication interface(s) 606 may enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 606 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 606 also provides other conventional connections to the network 414 for distribution of files and/or media objects using standard network protocols such as TCP/IP, HTTP, HTTPS and SMTP as will be understood.

The merchant device 410 may further include a display 620, which may employ any suitable display technology. For example, the display 620 may be a liquid crystal display, a plasma display, a light emitting diode display, an OLED (organic light-emitting diode) display, an electronic paper display, or any other suitable type of display able to present digital content thereon. In some embodiments, the display 620 may have a touch sensor associated with the display 620 to provide a touchscreen display configured to receive touch inputs for enabling interaction with a graphical user interface presented on the display 620. Accordingly, embodiments described herein are not limited to any particular display technology. Alternatively, in some embodiments, the merchant device 410 may not include the display 620, and information may be presented by other means, such as aurally.

The merchant device 410 may further include one or more I/O devices 608. The I/O devices 608 may include speakers, a microphone, a camera, and various user controls (e.g., buttons, a joystick, a keyboard, a keypad, etc.), a haptic output device, and so forth.

In addition, the merchant device 410 may include or may be connectable to a payment card reader 630. In some embodiments, the payment card reader 630 may plug in to a port in the merchant device, such as a microphone/headphone port, a data port, or other suitable port. The payment card reader 630 may include a card interface for reading a magnetic stripe or an integrated circuit of a payment card 606, and further may include encryption technology for encrypting the information read from the payment card 406. Alternatively, numerous other types of payment card readers 630 may be employed with the merchant devices 410 herein, depending on the type and configuration of the merchant device 410.

As used here, the term "payment card" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms. In some embodiments, payment card may also include a virtual payment card stored on a device such as a smart phone or other device and transmittable, for example, via near field communication or other suitable means.

Other components included in the merchant device 410 may include various types of sensors (not shown), which may include a GPS device, an accelerometer, gyroscope, compass, proximity sensor, and the like. Additionally, the merchant device 410 may include various other components that are not shown, examples of which include removable storage, a power source, such as a battery and power control unit, and so forth.

A payment communication system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats.

Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:

1. A payment processing system comprising:
    one or more processors configured by executable instructions to perform operations comprising:
        receiving, from a plurality of merchant computing devices associated with a plurality of merchants, respectively, transaction information of transactions performed by respective merchants of the plurality of merchants, the merchant computing devices having respective instances of a merchant application installed thereon that configure the plurality of merchant computing devices as a plurality of point-of-sale (POS) terminals, respectively, the respective POS terminals communicating the transaction information over a network to the payment processing system, the plurality of POS terminals including a POS terminal associated with a merchant of the plurality of merchants;
        generating, based on an output of one or more trained machine learning classifiers and based on the transaction information determined about the merchant, a communication that is sent to a plurality of financial systems associated with a plurality of financial institutions, respectively, the one or more trained machine learning classifiers having been trained based on at least a portion of the transaction information received from the plurality of POS terminals of the plurality of merchants;
        exposing an application programming interface (API) of one or more APIs to at least one financial system of the plurality of financial systems for electronic communication of financial information at least one of to or from the at least one financial system; and
        generating, using the one or more trained machine learning classifiers and based at least on information obtained from the at least one financial system, via the API and based at least in part on the communication sent to the plurality of financial systems, one or more payment actions for the merchant to perform using the payment processing system.

2. The payment processing system as recited in claim 1, wherein the one or more payment actions include repayment of a financing offer through a portion of the transactions processed for the merchant by the payment processing system, credit scoring for the merchant, credit underwriting for the merchant, bill payment for the merchant, or invoice payment for the merchant.

3. The payment processing system as recited in claim 1, the operations further comprising transmitting, by the payment processing system, to the at least one financial system, a portion of the transactions processed by the payment processing system for the merchant.

4. The payment processing system as recited in claim 1, wherein:
    the transactions processed for the merchant are received via a mobile POS terminal serving as the POS terminal associated with the merchant; and
    the mobile POS terminal is associated with an account with the at least one financial system.

5. The payment processing system as recited in claim 1, the operations further comprising determining, using the one or more trained machine learning classifiers and one or more financial factors identified for the merchant, a custom payment action for the merchant.

6. The payment processing system as recited in claim 5, the operations further comprising determining a plurality of the financial factors for the merchant, the financial factors including at least one of:
    a merchant payment history for the merchant;
    a growth in payment volume of the merchant over a period of time; or
    an amount collected by the merchant from the transactions processed through the payment processing system.

7. The payment processing system as recited in claim 5, the operations further comprising transmitting, via the API, the custom payment action to the at least one financial system.

8. A method comprising:
    receiving, by one or more processors of a payment processing system, from a plurality of merchant computing devices associated with a plurality of merchants, respectively, transaction information of transactions performed by respective merchants of the plurality of merchants, the merchant computing devices having respective instances of a merchant application installed thereon that configure the plurality of merchant computing devices as a plurality of point-of-sale (POS) terminals, respectively, the respective POS terminals communicating the transaction information over a network to the payment processing system, the plurality of POS terminals including a POS terminal associated with a merchant of the plurality of merchants;

generating, based on an output of one or more trained machine learning classifiers and based on the transaction information determined about the merchant, a communication that is sent to a plurality of financial systems associated with a plurality of financial institutions, respectively, the one or more trained machine learning classifiers having been trained based on at least a portion of the transaction information received from the plurality of POS terminals of the plurality of merchants;

exposing an application programming interface (API) of one or more APIs to at least one financial system of the plurality of financial systems for electronic communication of financial information at least one of to or from the at least one financial system; and generating, using the one or more trained machine learning classifiers and based at least on information obtained from the at least one financial system, via the API and based at least in part on the communication sent to the plurality of financial systems, one or more payment actions for the merchant to perform using the payment processing system.

9. The method as recited in claim 8, wherein the one or more payment actions include repayment of a financing offer through a portion of the transactions processed for the merchant by the payment processing system, credit scoring for the merchant, credit underwriting for the merchant, bill payment for the merchant, or invoice payment for the merchant.

10. The method as recited in claim 8, further comprising transmitting, by the payment processing system, to the at least one financial system, a portion of the transactions processed by the payment processing system for the merchant.

11. The method as recited in claim 8, wherein:
the transactions processed for the merchant are received via a mobile POS terminal serving as the POS terminal associated with the merchant; and
the mobile POS terminal is associated with an account with the at least one financial system.

12. The method as recited in claim 8, further comprising determining, using the one or more trained machine learning classifiers and one or more financial factors identified for the merchant, a custom payment action for the merchant.

13. The method as recited in claim 12, further comprising determining a plurality of the financial factors for the merchant, the financial factors including at least one of:
a merchant payment history for the merchant;
a growth in payment volume of the merchant over a period of time; or
an amount collected by the merchant from the transactions processed through the payment processing system.

14. The method as recited in claim 12, further comprising transmitting, via the API, the custom payment action to the at least one financial system.

15. A non-transitory computer readable medium storing instructions that, when executed by one or more processors of a payment processing system, cause the one or more processors to perform operations comprising:
receiving, from a plurality of merchant computing devices associated with a plurality of merchants, respectively, transaction information of transactions performed by respective merchants of the plurality of merchants, the merchant computing devices having respective instances of a merchant application installed thereon that configure the plurality of merchant computing devices as a plurality of point-of-sale (POS) terminals, respectively, the respective POS terminals communicating the transaction information over a network to the payment processing system, the plurality of POS terminals including a POS terminal associated with a merchant of the plurality of merchants;

generating, based on an output of one or more trained machine learning classifiers and based on the transaction information determined about the merchant, a communication that is sent to a plurality of financial systems associated with a plurality of financial institutions, respectively, the one or more trained machine learning classifiers having been trained based on at least a portion of the transaction information received from the plurality of POS terminals of the plurality of merchants;

exposing an application programming interface (API) of one or more APIs to at least one financial system of the plurality of financial systems for electronic communication of financial information at least one of to or from the at least one financial system; and generating, using the one or more trained machine learning classifiers and based at least on information obtained from the at least one financial system, via the API and based at least in part on the communication sent to the plurality of financial systems, one or more payment actions for the merchant to perform using the payment processing system.

16. The non-transitory computer readable medium as recited in claim 15, wherein the one or more payment actions include repayment of a financing offer through a portion of the transactions processed for the merchant by the payment processing system, credit scoring for the merchant, credit underwriting for the merchant, bill payment for the merchant, or invoice payment for the merchant.

17. The non-transitory computer readable medium as recited in claim 15, the operations further comprising transmitting, by the payment processing system, to the at least one financial system, a portion of the transactions processed by the payment processing system for the merchant.

18. The non-transitory computer readable medium as recited in claim 15, wherein:
the transactions processed for the merchant are received via a mobile POS terminal serving as the POS terminal associated with the merchant; and
the mobile POS terminal is associated with an account with the at least one financial system.

19. The non-transitory computer readable medium as recited in claim 15, the operations further comprising determining, using the one or more trained machine learning classifiers and one or more financial factors identified for the merchant, a custom payment action for the merchant.

20. The non-transitory computer readable medium as recited in claim 19, the operations further comprising determining a plurality of the financial factors for the merchant, the financial factors including at least one of:
a merchant payment history for the merchant;
a growth in payment volume of the merchant over a period of time; or
an amount collected by the merchant from the transactions processed through the payment processing system.

* * * * *